United States Patent
Yan et al.

(10) Patent No.: US 12,442,778 B2
(45) Date of Patent: Oct. 14, 2025

(54) MEASUREMENT METHOD AND APPARATUS, AND RADIATION MEASURING DEVICE

(71) Applicant: CONTEMPORARY AMPEREX TECHNOLOGY (HONG KONG) LIMITED, Hong Kong (CN)

(72) Inventors: Liangjie Yan, Ningde (CN); Xing Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 155 days.

(21) Appl. No.: 18/479,898

(22) Filed: Oct. 3, 2023

(65) Prior Publication Data

US 2024/0027368 A1 Jan. 25, 2024

Related U.S. Application Data

(63) Continuation of application No. PCT/CN2023/095012, filed on May 18, 2023.

(30) Foreign Application Priority Data

May 25, 2022 (CN) .......................... 202210575858.5

(51) Int. Cl.
 *G01N 23/02* (2006.01)
 *G01N 23/20025* (2018.01)
 *H01M 10/42* (2006.01)
(52) U.S. Cl.
 CPC ....... *G01N 23/02* (2013.01); *G01N 23/20025* (2013.01); *H01M 10/4285* (2013.01); *G01N 2223/03* (2013.01)

(58) Field of Classification Search
 None
 See application file for complete search history.

(56) References Cited

U.S. PATENT DOCUMENTS

| | | | |
|---|---|---|---|
| 3,681,595 A | 8/1972 | Dahlin | |
| 4,692,616 A * | 9/1987 | Hegland | ................ G01G 17/02 |
| | | | 250/252.1 |
| 4,803,715 A | 2/1989 | Cho | |

FOREIGN PATENT DOCUMENTS

| | | |
|---|---|---|
| CN | 103206931 A | 7/2013 |
| CN | 104475462 A | 4/2015 |

(Continued)

OTHER PUBLICATIONS

The World Intellectual Property Organization (WIPO) International Search Report for PCT/CN2023/095012 Aug. 7, 2023 7 pages (Including English translation).

(Continued)

*Primary Examiner* — Hoon K Song
(74) *Attorney, Agent, or Firm* — ANOVA LAW GROUP, PLLC

(57) ABSTRACT

A measurement method includes determining a measured mass parameter of a workpiece being measured based on radiation intensity of rays that have passed through the workpiece being measured; and correcting the measured mass parameter by using a displacement curve function of the workpiece being measured in a measurement environment, to obtain the corrected mass parameter of the workpiece being measured, where the displacement curve function is used to characterize influence of environmental factors on radiation in the measurement environment.

20 Claims, 4 Drawing Sheets

(56) References Cited

FOREIGN PATENT DOCUMENTS

| | | |
|---|---|---|
| CN | 110031359 A | 7/2019 |
| CN | 209326587 U | 8/2019 |
| CN | 110231005 A | 9/2019 |
| CN | 111542743 A | 8/2020 |
| CN | 112033983 A | 12/2020 |
| EP | 1950527 A1 | 7/2008 |

OTHER PUBLICATIONS

The European Patent Office (EPO) The Extended European Search Report for 23768103.6 Apr. 3, 2024 8 Pages.

\* cited by examiner

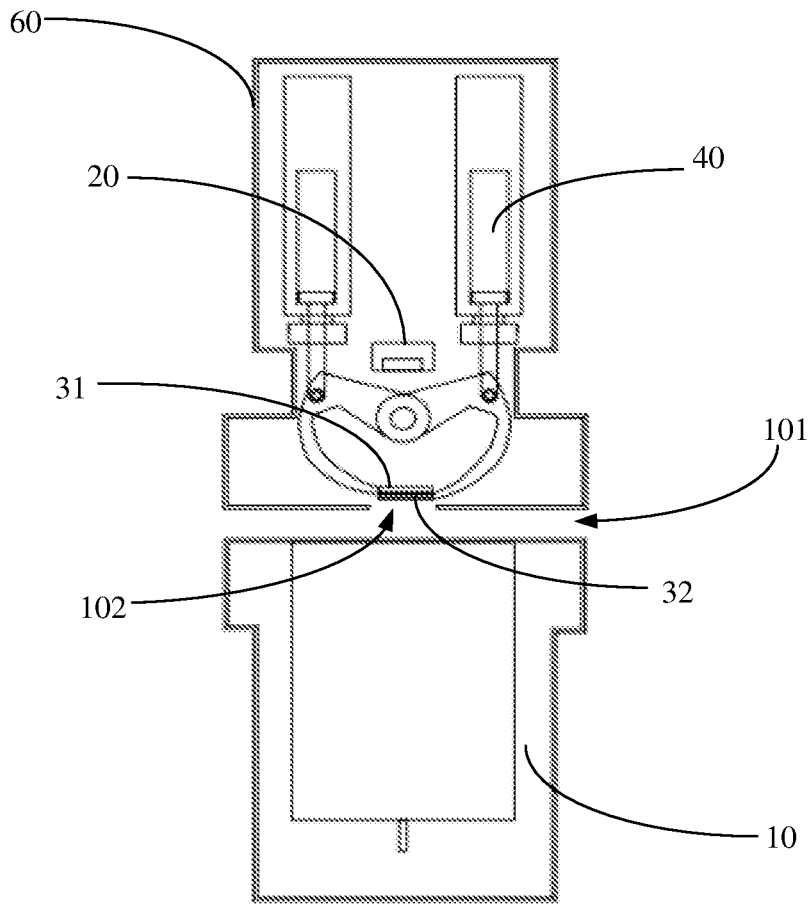

FIG. 2

Determine a measured mass parameter of a workpiece being measured based on radiation intensity of rays that have passed through the workpiece being measured — 301

Correct the measured mass parameter using a displacement curve function of a measurement environment in which the workpiece being measured is located, to obtain the corrected mass parameter of the workpiece being measured — 302

FIG. 3

MEASUREMENT METHOD AND APPARATUS, AND RADIATION MEASURING DEVICE

CROSS-REFERENCE TO RELATED APPLICATIONS

This application is a continuation of International Application No. PCT/CN2023/095012, filed on May 18, 2023, which claims priority to Chinese patent application No. 202210575858.5, filed on May 25, 2022 and entitled "MEASUREMENT METHOD AND APPARATUS, AND RADIATION MEASURING DEVICE", which are incorporated herein by reference in their entirety.

TECHNICAL FIELD

This application relates to the field of battery technologies, and in particular, to a measurement method and apparatus, and a radiation measuring device.

BACKGROUND

With the rapid development of physical technology, the measurement of mass parameters such as thickness, weight, and surface density of the workpiece being measured can be realized according to the principle of ray attenuation as rays pass through an object. This is gradually applied in various fields. For example, in the production of batteries, the thickness, weight, surface density and other mass parameters of the battery electrode plates are measured by radiation.

At present, in the measurement of a mass parameter of the workpiece being measured by radiation, the mass parameter of the workpiece being measured is usually calculated based on the radiation intensity and radiation attenuation coefficient after the rays have passed through the workpiece being measured. However, a mass parameter calculated solely based on the radiation intensity and radiation attenuation coefficient after the rays have passed through the workpiece being measured may have deviations from the actual mass parameter of the workpiece being measured, which can lead to a decrease in the accuracy of the measured mass parameter.

SUMMARY

Embodiments of this application are intended to provide a measurement method and apparatus, and a radiation measuring device, so as to solve the common problem of low measurement accuracy in measurement of a mass parameter of a workpiece at present.

According to a first aspect, an embodiment of this application provides a measurement method including:
  determining a measured mass parameter of a workpiece being measured based on radiation intensity of rays that have passed through the workpiece being measured; and
  correcting the measured mass parameter using a displacement curve function of the workpiece being measured in a measurement environment, to obtain the corrected mass parameter of the workpiece being measured, where the displacement curve function is used to characterize influence of environmental factors on radiation in the measurement environment.

In this embodiment of this application, the measured mass parameter of the workpiece being measured is determined based on the radiation intensity of the rays that have passed through the workpiece being measured, and then the measured mass parameter is corrected using the displacement function of the measurement environment in which the workpiece being measured is located, where the displacement curve function is used to characterize the influence of the environmental factors on radiation transmittance in the measurement environment. In this way, the influence of the environmental factors on the radiation transmittance of rays is considered and the measured mass parameter is corrected using the displacement curve function during the measurement, so that the measured mass parameter is closer to or consistent with an actual mass parameter, improving measurement accuracy.

In some embodiments, prior to the correcting the measured mass parameter using a displacement curve function of the workpiece being measured in a measurement environment, the method further includes:
  demarcating at least two demarcation pieces in the measurement environment to obtain a mass calibration curve of the measurement environment, the mass calibration curve being used to characterize a relationship between measured mass parameters and predetermined nominal mass parameters, of the demarcation pieces; and
  fitting the mass calibration curve of the measurement environment with respect to a mass calibration curve of a standard environment to obtain the displacement curve function, the displacement curve function being used to characterize an amount of change in radiation transmittance in the measurement environment relative to the standard environment.

In these embodiments, the above displacement curve function is obtained by fitting the mass calibration curve obtained by demarcation in the measurement environment with respect to the mass calibration curve obtained by measurement in the standard environment, so that the obtained displacement curve can better reflect influence of the measurement environment on the radiation transmittance, thus making the final determined mass parameter more accurate.

In some embodiments, the measurement environment is different from the standard environment in terms of contaminants as well as target influencing factors, the target influencing factors including environmental factors that cause a change in radiation transmittance other than the contaminants.

In these embodiments, the measurement environment is different from the standard environment in terms of both contaminants as well as target influencing factors, so that not only influence of the contaminants on the radiation transmittance is considered, but also influence of the target influencing factors on the radiation transmittance is considered, resulting in a more accurate corrected mass parameter.

In some embodiments, the method further includes:
  obtaining a first initial displacement and a second initial displacement by simulation, the first initial displacement being used to characterize a deviation of the radiation transmittance only under influence of a contaminant in the measurement environment in comparison with the radiation transmittance in the standard environment; and the second initial displacement being used to characterize a deviation of the radiation transmittance in the measurement environment in comparison with the radiation transmittance in the standard environment; and
  updating the displacement curve function based on a ratio of the second initial displacement to the first initial displacement, where the updated displacement curve function is a product of the displacement curve function before the update and the ratio.

In these embodiments, the first initial displacement generated under the influence of the contaminant in the measurement environment and the second initial displacement generated in the measurement environment (that is, the influence of the contaminant as well as a target influencing factor are included) are first obtained, then the ratio of the second initial displacement to the first initial displacement is calculated, and ultimately the displacement curve function is updated to the product of the fitted displacement curve function and the ratio, so that the generated displacement curve function takes into account both the influence of the contaminant on the radiation and also the influence of other factors on the radiation, which makes the determined displacement curve function more accurate and thus makes the measured mass parameter more precise.

In some embodiments, each initial displacement is calculated using the following formula:

$$C = I_f/I_a - I_f^0/I_a^0$$

where C represents the initial displacement;

$I_f$ represents a radiation intensity measured after the rays have passed through the demarcation piece in an environment corresponding to the initial displacement;

$I_a$ represents a radiation intensity measured after the rays have passed through the air in the environment corresponding to the initial displacement;

$I_f^0$ represents a radiation intensity measured after the rays have passed through the demarcation piece in the standard environment; and $I_a^0$ represents a radiation intensity measured after the rays have passed through the air in the standard environment.

In these embodiments, the difference between the radiation transmittance under the environment corresponding to the initial displacement and the radiation transmittance under the standard environment being determined as the initial displacement makes the determined initial displacement more reasonable, thereby making the updated displacement curve function more accurately characterize the influence of each environmental factor on the radiation in the measurement environment, and further improving the measurement accuracy of the mass parameter.

In some embodiments, each mass calibration curve is obtained using the following formula:

$$Q = Q_1 - \frac{1}{\mu} \log_e \frac{I_s}{I_a} \bigg/ \frac{I_s^0}{I_a^0}$$

where Q represents a measured mass parameter of the demarcation piece calculated based on a radiation intensity and radiation attenuation coefficient of the rays that have passed through the demarcation piece;

$Q_1$ represents an actual mass parameter of the demarcation piece;

μ represents the radiation attenuation coefficient;

$I_s$ represents a radiation intensity measured after the rays have passed through the demarcation piece in an environment corresponding to the mass calibration curve;

$I_a$ represents a radiation intensity measured after the rays have passed through the air in the environment corresponding to the mass calibration curve;

$I_a^0$ represents a radiation intensity of the rays emitted by a radiation source; and $I_s^0$ represents a radiation intensity of the demarcation piece.

In these embodiments, the above formula is used for obtaining each mass calibration curve so that the obtained mass calibration curve conforms to the Beer's law, thereby improving the accuracy of the mass calibration curve and thus further improving the accuracy of the measured mass parameter.

In some embodiments, the demarcating the at least two demarcation pieces in the measurement environment to obtain a mass calibration curve of the measurement environment includes:

when a predetermined period is reached, demarcating the at least two demarcation pieces in the measurement environment to obtain a mass calibration curve of the measurement environment.

In these embodiments, when the predetermined period is reached, the at least two demarcation pieces in the measurement environment are demarcated to obtain the mass calibration curve of the measurement environment, allowing timely updating of the displacement curve function, and thus making the measured mass parameter more precise.

In some embodiments, the workpiece being measured includes a battery electrode plate, and the mass parameter includes surface density of the battery electrode plate.

In these embodiments, a measured surface density can be corrected during production of the battery electrode plate, so that the measured surface density is closer to or consistent with an actual surface density, improving the measurement accuracy of the surface density of the battery electrode plate.

According to a second aspect, an embodiment of this application further provides a measurement apparatus including:

a measured mass parameter determining module configured to determine a measured mass parameter of a workpiece being measured based on radiation intensity of rays that have passed through the workpiece being measured; and a mass parameter correction module configured to correct the measured mass parameter using a displacement curve function of the workpiece being measured in a measurement environment, to obtain the corrected mass parameter of the workpiece being measured, where the displacement curve function is used to characterize influence of environmental factors on radiation in the measurement environment.

In this embodiment of this application, the measured mass parameter of the workpiece being measured is determined based on the radiation intensity of the rays that have passed through the workpiece being measured, and then the measured mass parameter is corrected using the displacement function of the measurement environment in which the workpiece being measured is located, where the displacement curve function is used to characterize the influence of the environmental factors on the radiation transmittance in the measurement environment. In this way, the influence of the environmental factors on the radiation transmittance of rays is considered and the measured mass parameter is corrected using the displacement curve function during the measurement, so that the measured mass parameter is closer to or consistent with an actual mass parameter, improving measurement accuracy.

In some embodiments, the apparatus further includes:

a mass calibration curve generation module configured to demarcate at least two demarcation pieces in a measurement environment to obtain a mass calibration curve of the measurement environment, the mass calibration curve being used to characterize a relationship between measured mass parameters and predetermined nominal mass parameters, of the demarcation pieces; and a displacement curve function generation module configured to fit the mass calibration curve of the measurement environment with respect to a mass calibration curve of a standard environment to obtain the displacement curve function, the displacement curve function being used to characterize an amount of change in radiation transmittance in the measurement environment relative to the standard environment.

In these embodiments, the above displacement curve function is obtained by fitting the mass calibration curve obtained by demarcation in the measurement environment with respect to the mass calibration curve obtained by measurement in the standard environment, so that the obtained displacement curve can better reflect influence of the measurement environment on the radiation transmittance, thus making the final determined mass parameter more accurate.

In some embodiments, the measurement environment is different from the standard environment in terms of contaminants as well as target influencing factors, the target influencing factors including environmental factors that cause a change in radiation transmittance other than the contaminants.

In these embodiments, the measurement environment is different from the standard environment in terms of both contaminants as well as target influencing factors, so that not only influence of the contaminants on the radiation transmittance is considered, but also influence of the target influencing factors on the radiation transmittance is considered, resulting in a more accurate corrected mass parameter.

In some embodiments, the apparatus further includes:
a simulation module configured to obtain a first initial displacement and a second initial displacement by simulation, the first initial displacement being used to characterize a deviation of the radiation transmittance only under influence of a contaminant in the measurement environment in comparison with the radiation transmittance in the standard environment; and the second initial displacement being used to characterize a deviation of the radiation transmittance in the measurement environment in comparison with the radiation transmittance in the standard environment; and a displacement curve function update module configured to update the displacement curve function based on a ratio of the second initial displacement to the first initial displacement, where the updated displacement curve function is a product of the displacement curve function before the update and the ratio.

In these embodiments, the first initial displacement generated under the influence of the contaminant in the measurement environment and the second initial displacement generated in the measurement environment (that is, the influence of the contaminant as well as a target influencing factor are included) are first obtained, then the ratio of the second initial displacement to the first initial displacement is calculated, and ultimately the displacement curve function is updated to the product of the fitted displacement curve function and the ratio, so that the generated displacement curve function takes into account both the influence of the contaminant on the radiation and also the influence of other factors on the radiation, which makes the determined displacement curve function more accurate and thus makes the measured mass parameter more precise.

In some embodiments, each initial displacement is calculated using the following formula:

$$C = I_f/I_a - I_f^0/I_a^0$$

where C represents the initial displacement;
$I_f$ represents a radiation intensity measured after the rays have passed through the demarcation piece in an environment corresponding to the initial displacement;
$I_a$ represents a radiation intensity measured after the rays have passed through the air in the environment corresponding to the initial displacement;
$I_f^0$ represents a radiation intensity measured after the rays have passed through the demarcation piece in the standard environment; and
$I_a^0$ represents a radiation intensity measured after the rays have passed through the air in the standard environment.

In these embodiments, the difference between the radiation transmittance under the environment corresponding to the initial displacement and the radiation transmittance under the standard environment being determined as the initial displacement makes the determined initial displacement more reasonable, thereby making the updated displacement curve function more accurately characterize the influence of each environmental factor on the radiation in the measurement environment, and further improving the measurement accuracy of the mass parameter.

In some embodiments, each mass calibration curve is obtained using the following formula:

$$Q = Q_1 - \frac{1}{\mu} \log_e \frac{I_s}{I_a} \bigg/ \frac{I_s^0}{I_a^0}$$

where Q represents a measured mass parameter of the demarcation piece calculated based on a radiation intensity and radiation attenuation coefficient of the rays that have passed through the demarcation piece;
$Q_1$ represents an actual mass parameter of the demarcation piece;
$\mu$ represents the radiation attenuation coefficient;
$I_s$ represents a radiation intensity measured after the rays have passed through the demarcation piece in an environment corresponding to the mass calibration curve;
$I_a$ represents a radiation intensity measured after the rays have passed through the air in the environment corresponding to the mass calibration curve;
$I_a^0$ represents a radiation intensity of the rays emitted by a radiation source; and
$I_s^0$ represents a radiation intensity of the demarcation piece.

In these embodiments, the above formula is used for obtaining each mass calibration curve so that the obtained mass calibration curve conforms to the Beer's law, thereby improving the accuracy of the mass calibration curve and thus further improving the accuracy of the measured mass parameter.

In some embodiments, the mass calibration curve generation module is specifically configured to:
when a predetermined period is reached, demarcate the at least two demarcation pieces in the measurement environment to obtain a mass calibration curve of the measurement environment.

In these embodiments, when the predetermined period is reached, the at least two demarcation pieces in the measurement environment are demarcated to obtain the mass calibration curve of the measurement environment, allowing timely updating of the displacement curve function, and thus making the measured mass parameter more precise.

In some embodiments, the workpiece being measured includes a battery electrode plate, and the mass parameter includes surface density of the battery electrode plate.

In these embodiments, a measured surface density can be corrected during production of the battery electrode plate, so that the measured surface density is closer to or consistent with an actual surface density, improving the measurement accuracy of the surface density of the battery electrode plate.

According to a third aspect, an embodiment of this application further provides a radiation measuring device including:

- a radiation source;
- a radiation detector, where a gap is provided between the radiation detector and the radiation source, and the gap is configured to allow a workpiece being measured to pass;
- at least two demarcation pieces having different thicknesses, where the at least two demarcation pieces are disposed on a plane on which the gap is located;
- a drive assembly connected to the at least two demarcation pieces, where the drive assembly is configured to drive the demarcation pieces separately to move into the gap; and
- a control means electrically connected to the drive assembly, the radiation source, and the radiation detector, where the control means is configured to perform the method according to the first aspect.

In this embodiment of this application, the radiation measuring device can perform the foregoing measurement method. In this way, the influence of the environmental factors on the radiation transmittance of rays is considered and the measured mass parameter is corrected using the displacement curve function, obtained by demarcation, during the measurement, so that the measured mass parameter is closer to or consistent with an actual mass parameter, improving the measurement accuracy; and moreover, the foregoing at least two demarcation pieces being disposed in the gap that is for the workpiece being measured to pass can implement demarcation in the measurement environment without the need for offline demarcation, making the demarcation more convenient and time-saving.

In some embodiments, the radiation measuring device includes:

- a first demarcation piece and a second demarcation piece, where the first demarcation piece and the second demarcation piece are spaced apart along a direction from the radiation source to the radiation detector; and
- the drive assembly is configured to drive the first demarcation piece and the second demarcation piece separately to move into the gap, and drive the first demarcation piece and the second demarcation piece to move simultaneously into the gap to form a third demarcation piece.

In these embodiments, three sets of demarcation pieces can be demarcated using two demarcation pieces so as to generate a mass calibration curve, thus making the structure of the radiation measuring device simpler and reducing workload of disassembling and assembling the demarcation pieces.

According to a fourth aspect, an embodiment of this application provides a radiation measuring device, where the radiation measuring device includes a processor, a memory, and a program or instructions stored in the memory and capable of running on the processor, and when the program or instructions are executed by the processor, the steps of the method according to the first aspect are implemented.

According to a fifth aspect, an embodiment of this application provides a readable storage medium, where the readable storage medium stores a program or instructions, and when the program or instructions are executed by a processor, the steps of the method according to the first aspect are implemented.

The foregoing description is merely an overview of the technical solutions of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

FIG. 2 is a schematic diagram of a partial structure of a radiation measuring device according to an embodiment of this application;

FIG. 3 is a schematic flowchart of a measurement method according to an embodiment of this application;

DESCRIPTION OF EMBODIMENTS

The following clearly describes the technical solutions in the embodiments of this application with reference to the accompanying drawings in the embodiments of this application. Apparently, the described embodiments are some but not all embodiments of this application. All other embodiments obtained by persons of ordinary skill in the art based on the embodiments of this application shall fall within the protection scope of this application.

In the specification and claims of this application, the terms "first", "second", and the like are intended to distinguish between similar objects rather than to indicate a particular order or sequence. It should be understood that data used in this way are interchangeable in appropriate circumstances such that the embodiments of this application can be implemented in other orders than the order illustrated or described herein. In addition, objects distinguished by "first", "second", and the like are generally of a same type, and the quantities of the objects are not limited, for example, there may be one or more first objects. In addition, in the specification and the claims, "and/or" indicates at least one of the associated objects, and the character "I" generally indicates an "or" relationship between contextually associated objects.

In the related art, in the process of measuring mass parameters such as thickness, weight, and surface density of a workpiece being measured based on the principle of ray attenuation as rays pass through an object, usually only the ray attenuation caused by the workpiece being measured is considered. However, in an actual measurement environment, environmental factors such as contaminants (for example, dust and dirt), temperature, and air pressure in the measurement environment also affect the attenuation of rays. Therefore, in the actual measurement environment, a measured radiation intensity is actually the intensity of the rays that have passed through the workpiece being measured and that have been affected by environmental factors. To be specific, the measured radiation intensity is lower than the actual intensity of the rays that have passed through the workpiece being measured without the influence of the environmental factors, so that a measurement parameter calculated based on the intensity of the rays that have passed the workpiece being measured and the radiation attenuation coefficient deviates from an actual mass parameter.

It can be learned that in the related art, accuracy of measured mass parameters is low due to the attenuation of rays being affected by environmental factors.

To improve the accuracy of measuring, using radiation, a mass parameter of a workpiece being measured, this application proposes a measurement method and apparatus, and a radiation measuring device.

Figure 1:
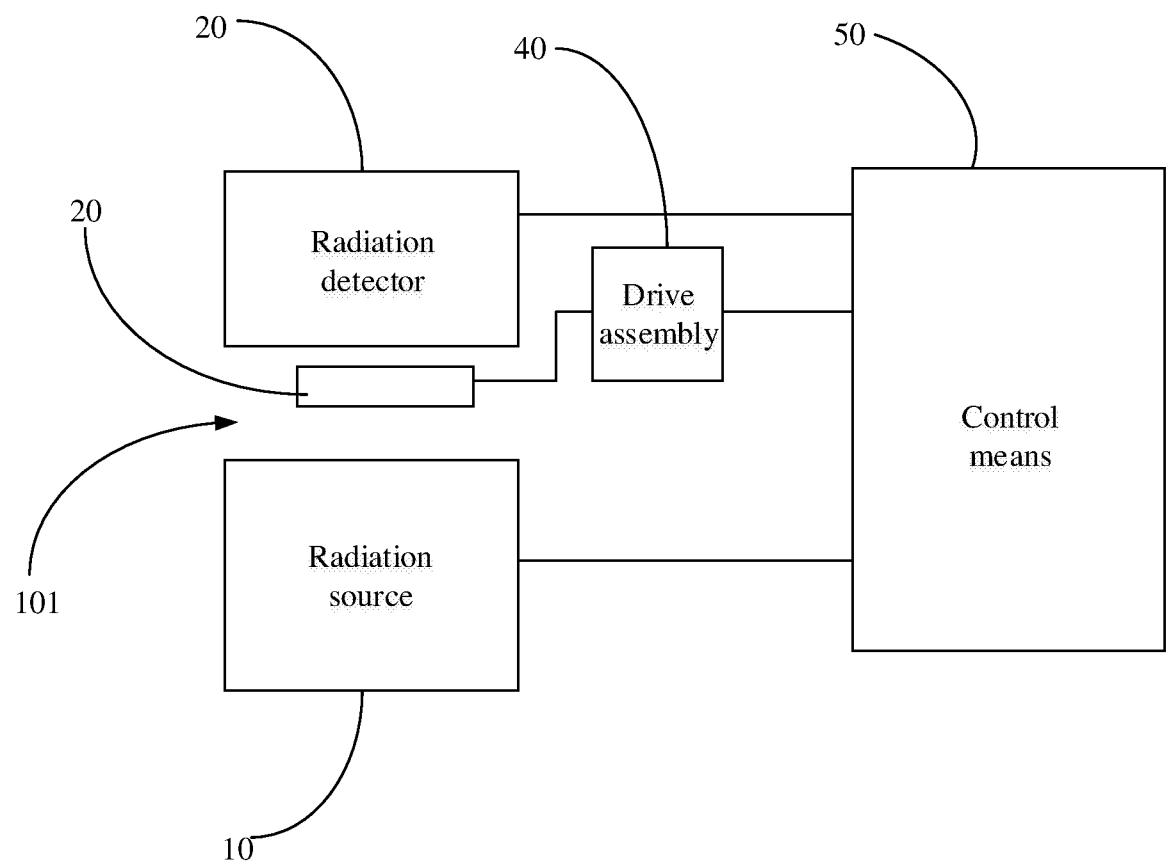
FIG. 1 is a schematic structural diagram of a radiation measuring device according to an embodiment of this application.

Referring to FIG. 1, FIG. 1 is a schematic structural diagram of a radiation measuring device according to an embodiment of this application. As shown in FIG. 1, the radiation measuring device includes a radiation source 10, a radiation detector 20, at least two demarcation pieces 30, a drive assembly 40, and a control means 50.

The radiation source 10 is configured to emit rays.

A gap 101 is provided between the radiation detector 20 and the radiation source 10, where the gap 101 is configured to allow a workpiece being measured to pass, and the radiation detector 20 is configured to measure radiation intensity of received rays.

Each of the at least two demarcation pieces 30 is capable of moving into the gap 101, and different demarcation pieces have different thicknesses.

The drive assembly 40 is connected to the at least two demarcation pieces 30, and the drive assembly 40 is configured to drive at least one of the demarcation pieces separately to move into the gap 101.

The control means 50 is electrically connected to the drive assembly 40, the radiation source 10, and the radiation detector 20.

In this embodiment of this application, during measurement, when the workpiece being measured is transferred to the gap 101 between the radiation detector 20 and the radiation source 10, the control means 50 can obtain the radiation intensity of the rays measured by the radiation detector 20 after the rays have passed through the workpiece being measured, and then obtain a measured mass parameter of the workpiece being measured based on the radiation intensity and the radiation attenuation coefficient of the workpiece being measured; and ultimately, the measured mass parameter is corrected using a displacement curve function of the measurement environment in which the workpiece being measured is located to obtain the corrected mass parameter of the workpiece being measured, where the displacement curve function is obtained by demarcating at least two demarcation pieces 30 with rays, and the displacement curve function is used to characterize the influence of environmental factors on radiation transmittance in the measurement environment.

In this way, the influence of the environmental factors on the radiation transmittance of rays is considered and the measured mass parameter is corrected using the displacement curve function, obtained by demarcation, during the measurement, so that the measured mass parameter is closer to or consistent with an actual mass parameter, improving the measurement accuracy; and moreover, the foregoing at least two demarcation pieces 30 being disposed in the gap 101 that is for the workpiece being measured to pass can implement demarcation in the measurement environment without the need for offline demarcation, making the demarcation more convenient and time-saving.

During the process of obtaining the displacement curve function by demarcating the at least two demarcation pieces 30 with rays, the above control means 50 can control the drive assembly 40 to drive one or more demarcation pieces separately to move into the gap 101, so that the rays pass through multiple sets of demarcation pieces with different thicknesses during demarcation, and the radiation intensity of the rays after the rays have passed through the multiple sets of demarcation pieces with different thicknesses (that are, at least two demarcation pieces 30) is measured by the radiation detector 20. Based on the radiation intensities and radiation attenuation coefficients corresponding to the multiple sets of demarcation pieces with different thicknesses, and actual mass parameters of the demarcation pieces, the mass calibration curve in the measurement environment is generated. The displacement curve function is obtained by fitting of the mass calibration curve under the measurement environment with the mass calibration curve in a predetermined standard environment.

Among the above multiple sets of demarcation pieces with different thicknesses, each demarcation piece set may contain only one demarcation piece. For example, if the above mass calibration curve is generated by measuring the radiation intensities corresponding to N (N may be an integer greater than or equal to 3) sets of demarcation pieces, N demarcation pieces with different thicknesses can be configured in the above radiation measuring device, and the drive assembly 40 drives each of the N demarcation pieces separately to move into the above gap 101 to implement demarcation of each demarcation piece.

Alternatively, among the above multiple sets of demarcation pieces with different thicknesses, each set of demarcation pieces may contain multiple demarcation pieces, that is, during demarcation, the drive assembly 40 may drive one or more of M (M may be an integer greater than or equal to 2) demarcation pieces to move into the gap 101; and when multiple demarcation pieces are driven to move into the gap 101, the rays may pass through the multiple demarcation pieces in sequence to implement demarcation of a demarcation piece set formed by combination of multiple demarcation pieces.

In some embodiments, as shown in FIG. 2, the radiation measuring device includes:

a first demarcation piece 31 and a second demarcation piece 32, where the first demarcation piece 31 and the second demarcation piece 32 are spaced apart along a direction from the radiation source 10 to the radiation detector 20.

The drive assembly 40 is configured to drive the first demarcation piece 31 and the second demarcation piece 32 separately to move into the gap 101, and drive the first demarcation piece 31 and the second demarcation piece 32 to move simultaneously into the gap 101 to form a third demarcation piece.

In this way, three sets of demarcation pieces can be demarcated using two demarcation pieces so as to generate a mass calibration curve, thus making the structure of the radiation measuring device simpler and reducing workload of disassembling and assembling the demarcation pieces.

Certainly, the foregoing radiation measuring device may be provided with three or more demarcation pieces, and the drive assembly 40 can drive each demarcation piece to move into the gap 101 separately or simultaneously, so that more demarcation sets can be demarcated, thus making the generated mass calibration curve more accurate.

In some embodiments, the above radiation measuring device may further include a housing 60, and the radiation detector 20, the drive assembly 40, and the at least two demarcation pieces 30 are disposed in the housing 60. The housing 60 is provided with a through hole 102, where the through hole 102 is located between the radiation source 10 and the radiation detector 20. The rays emitted by the radiation source 10 can pass through the through hole 102 and be received by the radiation detector 20. Each of the at least two demarcation pieces 30 can be driven by the drive assembly 40 to the through hole 102, so that during demarcation, the rays enter the demarcation piece through the through hole 102, pass through the demarcation piece, and enter the detection receiver.

In some embodiments, the above drive assembly 40 may include at least two drive members. The at least two drive members correspond to the above at least two demarcation pieces 30, each drive member is connected to its corresponding demarcation piece, and each drive member is configured to drive its corresponding demarcation piece to move.

Referring to FIG. 3, FIG. 3 is a schematic flowchart of a measurement method according to an embodiment of this application and applied to the foregoing radiation measuring device. As shown in FIG. 3, the method includes the following steps.

Step 301. Determine a measured mass parameter of a workpiece being measured based on radiation intensity of rays that have passed through the workpiece being measured.

Step 302. Correct the measured mass parameter using a displacement curve function of the workpiece being measured in a measurement environment, to obtain the corrected mass parameter of the workpiece being measured, where the displacement curve function is used to characterize influence of environmental factors on radiation transmittance in the measurement environment.

In this embodiment of this application, the measured mass parameter of the workpiece being measured is determined based on the radiation intensity of the rays that have passed through the workpiece being measured, and then the measured mass parameter is corrected using the displacement function of the measurement environment in which the workpiece being measured is located, where the displacement curve function is used to characterize the influence of the environmental factors on the radiation transmittance in the measurement environment. In this way, the influence of the environmental factors on the radiation transmittance of rays is considered and the measured mass parameter is corrected using the displacement curve function during the measurement, so that the measured mass parameter is closer to or consistent with an actual mass parameter, improving measurement accuracy.

In step 301, when the workpiece being measured moves into the gap between the radiation source and the radiation detector, the foregoing radiation measuring device can obtain the radiation intensity of the rays after the rays have passed through the workpiece being measured by measuring with the radiation detector.

The above workpiece being measured may be any workpiece that requires measurement of at least one mass parameter such as thickness, weight, and surface density during production. The workpiece being measured may be a sheet or plate-shaped workpiece, such as aluminum foil or copper foil sheet. Specifically, the above workpiece being measured may be a battery electrode plate during battery production, and furthermore, the workpiece being measured may be a battery electrode plate during coating.

After obtaining the above radiation intensity, the radiation measuring device can obtain a measured mass parameter of the workpiece being measured based on the radiation intensity and the radiation attenuation coefficient of the workpiece being measured.

The foregoing radiation attenuation coefficient may be obtained by demarcating at least two demarcation pieces with the rays emitted by the radiation source, and each demarcation piece is a standard workpiece having the same or close radiation attenuation coefficient as the workpiece being measured. The actual mass parameters of each standard workpiece are known, and different demarcation pieces have different thicknesses.

The above radiation attenuation coefficient obtained by demarcating at least two demarcation pieces with rays may be calculated using the following formula (1):

$$\mu = -\frac{1}{Q_2 - Q_1} \log_e \frac{I_2}{I_1}, \qquad (1)$$

where
$\mu$ represents the radiation attenuation coefficient;
$Q_1$ represents an actual mass parameter (for example, thickness, weight, or surface density) of demarcation piece 1 among the above at least two demarcation pieces;
$Q_2$ represents an actual mass parameter of demarcation piece 2 among the above at least two demarcation pieces, and is different;
$I_1$ represents the radiation intensity of the rays after the rays have passed through the demarcation piece 1; and
$I_2$ represents the radiation intensity of the rays after the rays have passed through the demarcation piece 2.

It should be noted that the obtaining radiation attenuation coefficient by demarcating at least two demarcation pieces with rays may be performed when the radiation source is replaced or when a material of the workpiece being measured and the like are changed.

The obtaining a measured mass parameter of the workpiece being measured based on the radiation intensity and the radiation attenuation coefficient of the workpiece being measured may be inputting the radiation intensity and the radiation attenuation coefficient into a predetermined measured mass parameter calculation model to obtain the measured mass parameter by calculation using the measured mass parameter calculation model. The process of obtaining a measured mass parameter using the measured mass parameter calculation model is well known in the art and is not described herein.

In step 302, after obtaining the measured mass parameter of the workpiece being measured, the radiation measuring device can correct the measured mass parameter based on a displacement curve function of the measurement environment in which the workpiece being measured is located.

The displacement curve function may be obtained by demarcating at least two demarcation pieces with rays, and the displacement curve function is used to characterize the influence of the environmental factors on the radiation transmittance in the measurement environment.

The obtaining the displacement curve function by demarcating at least two demarcation pieces with rays may be: obtaining the radiation intensities of the rays after the rays have passed through the at least two demarcation pieces separately, calculating the measured mass parameter of each demarcation piece based on the radiation intensity and the radiation attenuation coefficient corresponding to the demarcation piece, inputting each measured mass parameter and the corresponding actual mass parameter into the initial curve function, and then solving for parameter values in the initial curve function to obtain the displacement curve function.

For example, when the above initial curve function is a binary primary linear function, the scaling coefficients as well as constants of independent variables in the binary primary linear function can be obtained by solving based on each measured mass parameter and its corresponding time measurement parameter, and the above displacement curve function can be obtained by updating the binary primary linear function with the solved scaling coefficients and constants.

In some embodiments, prior to the correcting the measured mass parameter using a displacement curve function of the workpiece being measured in a measurement environment, the method further includes:
  demarcating at least two demarcation pieces in the measurement environment to obtain a mass calibration curve of the measurement environment, the mass calibration curve being used to characterize a relationship between measured mass parameters and predetermined nominal mass parameters, of the demarcation pieces; and
  fitting the mass calibration curve of the measurement environment with respect to a mass calibration curve of a standard environment to obtain the displacement curve function, the displacement curve function being used to characterize an amount of change in radiation transmittance in the measurement environment relative to the standard environment.

In these embodiments, the above displacement curve function is obtained by fitting the mass calibration curve obtained by demarcation in the measurement environment with respect to the mass calibration curve obtained by measurement in the standard environment, so that the obtained displacement curve can better reflect influence of the measurement environment on the radiation transmittance, thus making the final determined mass parameter more accurate.

The demarcating at least two demarcation pieces in the measurement environment to obtain a mass calibration curve of the measurement environment may be: determining, based on the measured mass parameters and predetermined nominal mass parameters of demarcation pieces in the measurement environment, corresponding coordinate points in a predetermined coordinate system, and plotting the curve using the coordinate points corresponding to the at least two demarcation pieces, to obtain the foregoing mass calibration curve. The predetermined coordinate system may be a coordinate system with a measured mass parameter and a nominal mass parameter as axes respectively, and the like.

The foregoing mass calibration curve of the standard environment is used to characterize a relationship between measured mass parameters and predetermined nominal mass parameters, of demarcation pieces, in the predetermined standard environment. The process of generating a mass calibration curve of the standard environment is similar to the process of generating a mass calibration curve of the measurement environment described above and is not repeated herein.

The foregoing predetermined standard environment may be understood as a predetermined environment in which there is no environmental factor other than air that has an effect on the radiation transmittance of rays, or an environment in which environmental factors present have a negligible influence on the radiation transmittance of rays.

For example, the standard environment may be an environment in which dust in the air is filtered out, and is of standard temperature, standard pressure, and the like; and in such an environment with no dust, with a standard temperature, standard pressure, and the like, the influence of the environment on the radiation transmittance of rays is negligible.

The fitting the mass calibration curve of the measurement environment with respect to a mass calibration curve of a standard environment to obtain the displacement curve function may be: performing an approximate straight-line fitting of the mass calibration curve of the measurement environment with respect to the mass calibration curve of the standard environment to obtain a linear function. For example, the obtained displacement curve function is a function of type $a+bQ$, a and b being constants, and Q being the measured mass parameter.

In some embodiments, the measurement environment is different from the standard environment in terms of contaminants as well as target influencing factors, the target influencing factors including environmental factors that cause a change in radiation transmittance other than the contaminants.

In these embodiments, the measurement environment is different from the standard environment in terms of both contaminants as well as target influencing factors, so that not only influence of the contaminants on the radiation transmittance is considered, but also influence of the target influencing factors on the radiation transmittance is considered, resulting in a more accurate corrected mass parameter.

In some embodiments, the method further includes:
  obtaining a first initial displacement and a second initial displacement by simulation, the first initial displacement being used to characterize a deviation of the radiation transmittance only under influence of a contaminant in the measurement environment in comparison with the radiation transmittance in the standard environment; and the second initial displacement being used to characterize a deviation of the radiation transmittance in the measurement environment in comparison with the radiation transmittance in the standard environment; and
  updating the displacement curve function based on a ratio of the second initial displacement to the first initial displacement, where the updated displacement curve function is a product of the displacement curve function before the update and the ratio.

In these embodiments, the first initial displacement generated under the influence of the contaminant in the measurement environment and the second initial displacement generated in the measurement environment (that is, the influence of the contaminant as well as a target influencing factor are included) are first obtained, then the ratio of the second initial displacement to the first initial displacement is calculated, and ultimately the displacement curve function is updated to the product of the fitted displacement curve function and the ratio, so that the generated displacement curve function takes into account both the influence of the contaminant on the radiation and also the influence of other factors on the radiation, which makes the determined displacement curve function more accurate and thus makes the measured mass parameter more precise.

The obtaining a first initial displacement by simulation may be: adjusting the parameter values of the target influencing factors in the above measurement environment to parameter values that have no influence or negligible influence on the radiation transmittance of rays so that only contaminants in the environment have influence on the radiation transmittance of rays; and calculating the deviation of the radiation transmittance in the environment in comparison with the radiation transmittance in the standard environment.

For example, the temperature in the measurement environment may be adjusted to the standard temperature and the pressure may be adjusted to the standard pressure, so that only contaminants such as dust or dirt in the measurement environment affect the radiation transmittance of the rays, and the deviation of the radiation transmittance in the environment in comparison with the radiation transmittance in the standard environment, is calculated to obtain the first initial displacement.

The obtaining a second initial displacement by simulation may be: calculating the deviation of the radiation transmittance in the above measurement environment in comparison with the radiation transmittance in the standard environment, that is, the second initial displacement takes into account the influence of contaminants and target influencing factors on the radiation transmittance.

Each of the above initial displacements may be calculated based on the radiation transmittance in a corresponding environment thereof and the radiation transmittance in the standard environment. For example, the ratio of the transmittance of the two is determined as the above initial displacement.

In some embodiments, each initial displacement is calculated using the following formula:

$$C = I_f/I_a - I_f^0/I_a^0$$

(2), where

C represents the initial displacement;
$I_f$ represents a radiation intensity measured after the rays have passed through the demarcation piece in an environment corresponding to the initial displacement;
$I_a$ represents a radiation intensity measured after the rays have passed through the air in the environment corresponding to the initial displacement;
$I_f^0$ represents a radiation intensity measured after the rays have passed through the demarcation piece in the standard environment; and
$I_a^0$ represents a radiation intensity measured after the rays have passed through the air in the standard environment.

In these embodiments, the difference between the radiation transmittance under the environment corresponding to the initial displacement and the radiation transmittance under the standard environment being determined as the initial displacement makes the determined initial displacement more reasonable, thereby making the updated displacement curve function more accurately characterize the influence of each environmental factor on the radiation in the measurement environment, and further improving the measurement accuracy of the mass parameter.

In some embodiments, each mass calibration curve is obtained using the following formula:

$$Q = Q_1 - \frac{1}{\mu}\log_e \frac{I_s}{I_a} \bigg/ \frac{I_s^0}{I_a^0}, \qquad (3)$$

where

Q represents a measured mass parameter of the demarcation piece calculated based on a radiation intensity and radiation attenuation coefficient of the rays that have passed through the demarcation piece;
$Q_1$ represents an actual mass parameter of the demarcation piece;
$\mu$ represents the radiation attenuation coefficient;
$I_s$ represents a radiation intensity measured after the rays have passed through the demarcation piece in an environment corresponding to the mass calibration curve;
$I_a$ represents a radiation intensity measured after the rays have passed through the air (that is, the object being measured is not present in the gap) in the environment corresponding to the mass calibration curve;
$I_a^0$ a represents a radiation intensity of the rays emitted by a radiation source; and
$I_s^0$ represents a radiation intensity of the demarcation piece.

In these embodiments, the above formula is used for obtaining each mass calibration curve so that the obtained mass calibration curve conforms to the Beer's law, thereby improving the accuracy of the mass calibration curve and thus further improving the accuracy of the measured mass parameter.

In some embodiments, the demarcating the at least two demarcation pieces in the measurement environment to obtain a mass calibration curve of the measurement environment includes:

when a predetermined period is reached, demarcating the at least two demarcation pieces in the measurement environment to obtain a mass calibration curve of the measurement environment.

In these embodiments, when the predetermined period is reached, the at least two demarcation pieces in the measurement environment are demarcated to obtain the mass calibration curve of the measurement environment, allowing timely updating of the displacement curve function, and thus making the measured mass parameter more precise.

In some embodiments, the workpiece being measured includes a battery electrode plate, and the mass parameter includes surface density of the battery electrode plate.

In these embodiments, a measured surface density can be corrected during production of the battery electrode plate, so that the measured surface density is closer to or consistent with an actual surface density, improving the measurement accuracy of the surface density of the battery electrode plate.

To facilitate understanding of the measurement method provided in this embodiment of this application, the process of measuring weight of a workpiece using the method is described herein as follows.

Figure 4:
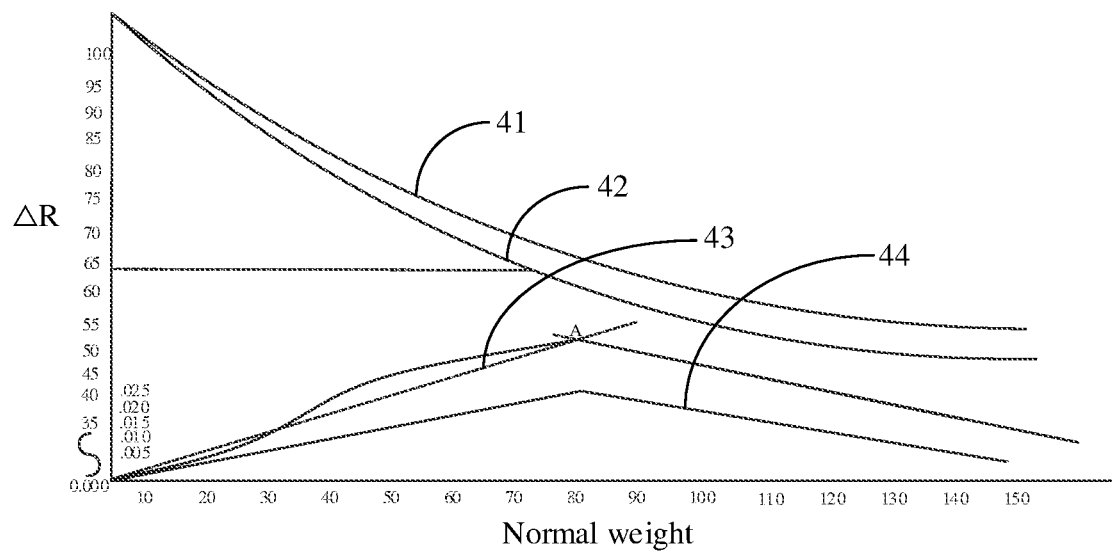
FIG. 4 is a curve diagram of a mass parameter in measurement of a workpiece according to an embodiment of this application.

At least two demarcation pieces may be demarcated in the measurement environment to obtain a mass calibration curve 41 of the measurement environment, as shown in FIG. 4. The mass calibration curve 41 conforms to the following formula (3-1):

$$Q = Q_1 - \frac{1}{\mu}\log_e \frac{I_s'}{I_a'} \bigg/ \frac{I_s^0}{I_a^0}, \qquad (3\text{-}1)$$

where
- $I_s$ represents a radiation intensity measured after the rays have passed through the demarcation piece in the measurement environment; and
- $I_a$ represents a radiation intensity measured after the rays have passed through the air in the measurement environment.

In addition, at least two demarcation pieces may be demarcated in the standard environment to obtain a mass calibration curve 42 of the measurement environment, as shown in FIG. 4. The mass calibration curve 42 conforms to the following formula (3-2):

$$Q = Q_1 - \frac{1}{\mu}\log_e \frac{I_s''}{I_a''} \bigg/ \frac{I_s^0}{I_a^0}, \quad (3\text{-}2)$$

where
- $I_s$ represents a radiation intensity measured after the rays have passed through the demarcation piece in the standard environment; and
- $I_a$ represents a radiation intensity measured after the rays have passed through the air in the standard environment, where the influence of air on the radiation transmittance is negligible in a standard environment, that is, $I_a$ is approximately equal to $I_a^0$.

The mass calibration curve 41 and the mass calibration curve 42 are straight-line fitted to obtain a displacement curve 43 shown in FIG. 4, which may be expressed by a function as a+bQ (that is, displacement curve function). The above displacement curve 43 has an inflection point A, that is, the displacement curve 43 may actually be expressed as a1+b1Q as well as a2+b2Q.

Further, assuming that the first initial displacement and the second initial displacement are calculated using the above formula (2) separately, an updated displacement curve 44 may be obtained using the following formula (4) (that is, the updated displacement curve function):

$$\Delta R = (a + bQ) \cdot \frac{C_0'}{C_0}. \quad (4)$$

Therefore, in the actual measurement, the updated displacement curve function may be obtained using the above formula (4) and then the measured mass parameter may be updated, which may be realized by using following formula (5):

$$Q = Q_1 - \frac{1}{\mu}\log_e \frac{\frac{I_s}{I_a} - \Delta R}{\frac{I_s^0}{I_a^0}}. \quad (5)$$

Figure 5:
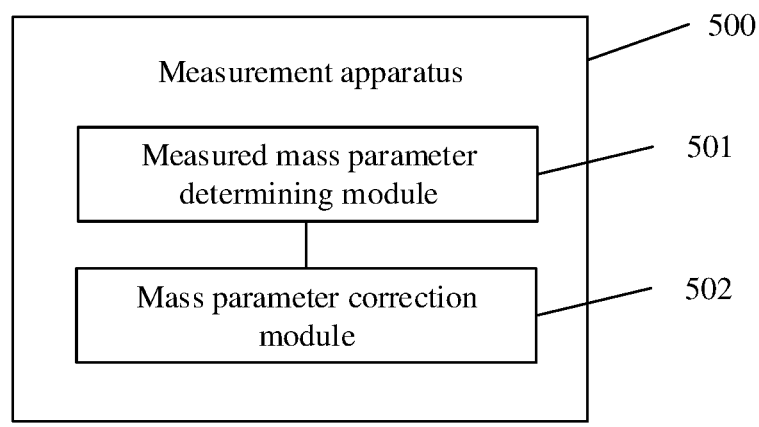
FIG. 5 is a schematic diagram of a measurement apparatus according to an embodiment of this application.

Referring to FIG. 5, FIG. 5 is a schematic structural diagram of a measurement apparatus according to an embodiment of this application. As shown in FIG. 5, the apparatus 500 includes:
- a measured mass parameter determining module 501 configured to determine a measured mass parameter of a workpiece being measured based on radiation intensity of rays that have passed through the workpiece being measured; and
- a mass parameter correction module 502 configured to correct the measured mass parameter using a displacement curve function of the workpiece being measured in a measurement environment, to obtain the corrected mass parameter of the workpiece being measured, where the displacement curve function is used to characterize influence of environmental factors on radiation in the measurement environment.

In this embodiment of this application, the measured mass parameter of the workpiece being measured is determined based on the radiation intensity of the rays that have passed through the workpiece being measured, and then the measured mass parameter is corrected using the displacement function of the measurement environment in which the workpiece being measured is located, where the displacement curve function is used to characterize the influence of the environmental factors on the radiation transmittance in the measurement environment. In this way, the influence of the environmental factors on the radiation transmittance of rays is considered and the measured mass parameter is corrected using the displacement curve function during the measurement, so that the measured mass parameter is closer to or consistent with an actual mass parameter, improving measurement accuracy.

In some embodiments, the apparatus further includes:
- a mass calibration curve generation module configured to demarcate at least two demarcation pieces in a measurement environment to obtain a mass calibration curve of the measurement environment, the mass calibration curve being used to characterize a relationship between measured mass parameters and predetermined nominal mass parameters, of the demarcation pieces; and
- a displacement curve function generation module configured to fit the mass calibration curve of the measurement environment with respect to a mass calibration curve of a standard environment to obtain the displacement curve function, the displacement curve function being used to characterize an amount of change in radiation transmittance in the measurement environment relative to the standard environment.

In these embodiments, the above displacement curve function is obtained by fitting the mass calibration curve obtained by demarcation in the measurement environment with respect to the mass calibration curve obtained by measurement in the standard environment, so that the obtained displacement curve can better reflect influence of the measurement environment on the radiation transmittance, thus making the final determined mass parameter more accurate.

In some embodiments, the measurement environment is different from the standard environment in terms of contaminants as well as target influencing factors, the target influencing factors including environmental factors that cause a change in radiation transmittance other than the contaminants.

In these embodiments, the measurement environment is different from the standard environment in terms of both contaminants as well as target influencing factors, so that not only influence of the contaminants on the radiation transmittance is considered, but also influence of the target influencing factors on the radiation transmittance is considered, resulting in a more accurate corrected mass parameter.

In some embodiments, the apparatus 500 further includes:
- a simulation module configured to obtain a first initial displacement and a second initial displacement by simulation, the first initial displacement being used to characterize a deviation of the radiation transmittance only under influence of a contaminant in the measurement environment in comparison with the radiation transmittance in the standard environment; and the second initial displacement being used to characterize a deviation of the radiation transmittance in the measurement environment in comparison with the radiation transmittance in the standard environment; and a displacement curve function update module configured to update the displacement curve function based on a ratio of the second initial displacement to the first initial displacement, where the updated displacement curve function is a product of the displacement curve function before the update and the ratio.

In these embodiments, the first initial displacement generated under the influence of the contaminant in the measurement environment and the second initial displacement generated in the measurement environment (that is, the influence of the contaminant as well as a target influencing factor are included) are first obtained, then the ratio of the second initial displacement to the first initial displacement is calculated, and ultimately the displacement curve function is updated to the product of the fitted displacement curve function and the ratio, so that the generated displacement curve function takes into account both the influence of the contaminant on the radiation and also the influence of other factors on the radiation, which makes the determined displacement curve function more accurate and thus makes the measured mass parameter more precise.

In some embodiments, each initial displacement is calculated using the following formula:

$$C = I_f/I_a - I_f^0/I_a^0$$

where C represents the initial displacement;

$I_f$ represents a radiation intensity measured after the rays have passed through the demarcation piece in an environment corresponding to the initial displacement;

$I_a$ represents a radiation intensity measured after the rays have passed through the air in the environment corresponding to the initial displacement;

$I_f^0$ represents a radiation intensity measured after the rays have passed through the demarcation piece in the standard environment; and $I_a^0$ represents a radiation intensity measured after the rays have passed through the air in the standard environment.

In these embodiments, the difference between the radiation transmittance under the environment corresponding to the initial displacement and the radiation transmittance under the standard environment being determined as the initial displacement makes the determined initial displacement more reasonable, thereby making the updated displacement curve function more accurately characterize the influence of each environmental factor on the radiation in the measurement environment, and further improving the measurement accuracy of the mass parameter.

In some embodiments, each mass calibration curve is obtained using the following formula:

$$Q = Q_1 - \frac{1}{\mu} \log_e \frac{I_s}{I_a} \Big/ \frac{I_s^0}{I_a^0}$$

where Q represents a measured mass parameter of the demarcation piece calculated based on a radiation intensity and radiation attenuation coefficient of the rays that have passed through the demarcation piece;

$Q_1$ represents an actual mass parameter of the demarcation piece;

$\mu$ represents the radiation attenuation coefficient;

$I_s$ represents a radiation intensity measured after the rays have passed through the demarcation piece in an environment corresponding to the mass calibration curve;

$I_a^0$ represents a radiation intensity measured after the rays have passed through the air in the environment corresponding to the mass calibration curve; and $I_s^0$ represents a radiation intensity of the demarcation piece.

In these embodiments, the above formula is used for obtaining each mass calibration curve so that the obtained mass calibration curve conforms to the Beer's law, thereby improving the accuracy of the mass calibration curve and thus further improving the accuracy of the measured mass parameter.

In some embodiments, the mass calibration curve generation module is specifically configured to:

when a predetermined period is reached, demarcate the at least two demarcation pieces in the measurement environment to obtain a mass calibration curve of the measurement environment.

In these embodiments, when the predetermined period is reached, the at least two demarcation pieces in the measurement environment are demarcated to obtain the mass calibration curve of the measurement environment, allowing timely updating of the displacement curve function, and thus making the measured mass parameter more precise.

In some embodiments, the workpiece being measured includes a battery electrode plate, and the mass parameter includes surface density of the battery electrode plate.

In these embodiments, a measured surface density can be corrected during production of the battery electrode plate, so that the measured surface density is closer to or consistent with an actual surface density, improving the measurement accuracy of the surface density of the battery electrode plate.

The measurement apparatus according to this embodiment of this application has similar details as the measurement method described above in conjunction with the embodiment shown in FIG. 3, and corresponding technical effects can be obtained. For brevity of description, details are not repeated herein.

Figure 6:
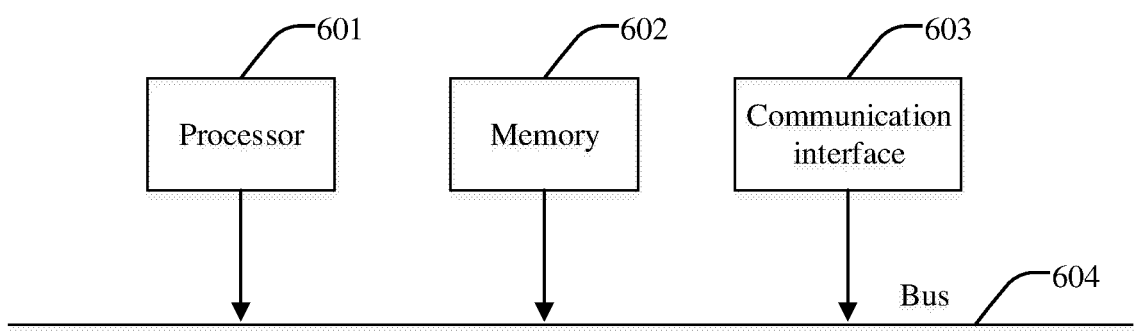
FIG. 6 is a schematic diagram of a hardware structure of a radiation measuring device according to an embodiment of this application.

FIG. 6 is a schematic diagram of a hardware structure of a radiation measuring device according to an embodiment of this application.

The radiation measuring device may include a processor 601 and a memory 602 that stores computer program instructions.

Specifically, the processor 601 may include a central processing unit (Central Processing Unit, CPU), or an application specific integrated circuit (Application Specific Integrated Circuit, ASIC), or may be configured as one or more integrated circuits for implementing the embodiments of this application.

The memory 602 may include a mass memory for data or instructions. By way of example rather than limitation, the memory 602 may include a hard disk drive (Hard Disk Drive, HDD), a floppy disk drive, a flash memory, an optical disk, a magnetic disk, a magnetic tape, a universal serial bus (Universal Serial Bus, USB) drive, or a combination of two or more thereof. In some embodiments, the memory 602 may include removable or non-removable (or fixed) media, or the memory 602 is a non-volatile solid state memory. In some embodiments, the memory 602 may be located inside or outside a battery apparatus.

In some embodiments, the memory 602 may be a read only memory (Read Only Memory, ROM). In an embodiment, the ROM may be a mask-programmed ROM, a programmable ROM (PROM), an erasable PROM (EPROM), an electrically erasable PROM (EEPROM), an electrically rewritable ROM (EAROM), a flash memory, or a combination of two or more thereof.

The memory 602 may include a read-only memory (ROM), a random access memory (RAM), a disk storage media device, an optical storage media device, a flash memory device, or an electrical, optical or another physical/tangible memory storage device. Therefore, typically, the memory includes one or more tangible (non-transitory) computer-readable storage media (for example, a memory device) encoded with software including computer-executable instructions, and when the software is executed (for example, by one or more processors), the computer-readable storage media can perform the operations described with reference to the method according to one aspect of this disclosure.

The processor 601 implements the method in the embodiment shown in FIG. 3 by reading and executing the computer program instructions stored in the memory 602, and achieves the corresponding technical effects, which are achieved in the embodiment shown in FIG. 3 by performing the method/steps thereof. For brevity of description, details are not repeated herein.

In an embodiment, the radiation measuring device may further include a communication interface 603 and a bus 604. As shown in FIG. 6, the processor 601, the memory 602, and the communication interface 603 are connected and complete communication with each other via the bus 604.

The communication interface 603 is mainly configured to implement communication between the modules, apparatuses, units, and/or devices in the embodiments of this application. The bus 604 includes hardware, software, or both, and couples the components of online data traffic billing devices to each other. By way of example rather than limitation, the bus may include an accelerated graphics port (Accelerated Graphics Port, AGP) or other graphics buses, an enhanced industry standard architecture (Enhanced Industry Standard Architecture, EISA) bus, a front side bus (Front Side Bus, FSB), hyper transport (Hyper Transport, HT) interconnect, an industry standard architecture (Industry Standard Architecture, ISA) bus, unlimited bandwidth interconnect, a low pin count (LPC) bus, a memory bus, a micro channel architecture (MCA) bus, a peripheral component interconnect (PCI) bus, a PCI-Express (PCI-X) bus, a serial advanced technology attachment (SATA) bus, a video electronics standards association local (VLB) bus, another suitable bus, or a combination of two or more thereof. Where appropriate, the bus 604 may include one or more buses. Although specific buses are described and illustrated in the embodiments of this application, any suitable bus or interconnect are considered in this application.

The radiation measuring device may perform the measurement method in the embodiments of this application, thereby implementing the measurement method and apparatus described in conjunction with FIGS. 3 and 4.

In addition, in conjunction with the measurement method and apparatus in the foregoing embodiments, an embodiment of this application may provide a computer storage medium for implementation. The computer storage medium stores computer program instructions; and when the computer program instructions are executed by a processor, the measurement method according to any one of the foregoing embodiments is implemented.

It should be noted that this application is not limited to the specific configurations and processing described and shown in the figures. For brevity, detailed descriptions of known methods are omitted herein. In the foregoing embodiments, several specific steps are described and illustrated as examples. However, the method and process of this application are not limited to the specific steps described and illustrated, and persons skilled in the art may make various changes, modifications, and additions, or change the order between steps, after appreciating the spirit of this application.

The functional blocks shown in the foregoing structural block diagrams may be implemented as hardware, software, firmware, or a combination thereof. When implemented as hardware, it may be, for example, an electronic circuit, an application specific integrated circuit (Application Specific Integrated Circuit, ASIC), appropriate firmware, a plug-in, a function card, or the like. When implemented as software, elements of this application are programs or code segments used to perform required tasks. The programs or code segments may be stored in a machine-readable medium or transmitted over a transmission medium or a communication link by a data signal carried in a carrier wave. The "machine-readable medium" may include any medium capable of storing or transmitting information. Examples of the machine-readable media include an electronic circuit, a semiconductor memory device, an ROM, a flash memory, an erasable ROM (EROM), a floppy disk, a CD-ROM, an optical disk, a hard disk, a fiber optic medium, a radio frequency (Radio Frequency, RF) link, and the like. The code segments may be downloaded via a computer network such as the Internet or an intranet.

It should also be noted that the exemplary embodiments mentioned in this application describe some methods or systems based on a series of steps or apparatuses. However, this application is not limited to the order of the steps mentioned above, to be specific, the steps may be performed in the order mentioned in the embodiments, or in an order different from the order in the embodiments, or several steps may be performed simultaneously.

The various aspects of this disclosure are described above with reference to flowcharts and/or block diagrams of the method, apparatus, device, and computer program products according to the embodiments of this disclosure. It should be understood that each block in the flowcharts and/or block diagrams and combinations of blocks in the flowcharts and/or block diagrams may be implemented by computer program instructions. These computer program instructions may be provided to a processor of a general-purpose computer, a special-purpose computer, or other programmable data processing devices to produce a machine such that these instructions executed by the processor of the computer or other programmable data processing devices are enabled to implement the functions/actions specified in one or more blocks of the flowcharts and/or block diagrams. Such a processor may be but is not limited to a general purpose processor, a specialized processor, a special application processor, or a field programmable logic circuit. It can further be understood that each block in the block diagrams and/or flowcharts and combinations of blocks in the block diagrams and/or flowcharts may also be implemented by dedicated hardware that performs specified functions or actions, or may be implemented by a combination of dedicated hardware and computer instructions.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A measurement method for measuring a mass parameter of a workpiece being measured, the method comprising:
   determining a measured mass parameter of the workpiece being measured based on radiation intensity of rays that have passed through the workpiece being measured; and
   correcting the measured mass parameter using a displacement curve function of the workpiece being measured in a measurement environment, to obtain the corrected mass parameter of the workpiece being measured, wherein the displacement curve function is used to characterize influence of environmental factors on radiation in the measurement environment and is obtained by:
      obtaining measured mass parameters of at least two demarcation pieces measured based on radiation intensity of rays that have passed through the at least two demarcation pieces; and
      solving for parameter values of an initial function according to the measured mass parameters of the at least two demarcation pieces and actual mass parameters of the at least two demarcation pieces to obtain the displacement function.

2. The method according to claim 1, wherein the workpiece being measured comprises a battery electrode plate, and the mass parameter comprises surface density of the battery electrode plate.

3. A radiation measuring device, comprising:
   a processor; and
   a memory storing a program or instructions that, when executed by the processor, cause the processor to perform the method according to claim 1.

4. A readable storage medium, storing a program or instructions that, when executed by a processor, cause the processor to perform the method according to claim 1.

5. The method according to claim 1, wherein the displacement function is a linear function.

6. A measurement method for measuring a mass parameter of a workpiece being measured, the method comprising:
   determining a measured mass parameter of the workpiece being measured based on radiation intensity of rays that have passed through the workpiece being measured; and
   correcting the measured mass parameter using a displacement function of the workpiece being measured in a measurement environment, to obtain the corrected mass parameter of the workpiece being measured, wherein the displacement function is used to characterize influence of environmental factors on radiation in the measurement environment and is obtained by:
      demarcating at least two demarcation pieces in the measurement environment to obtain a mass calibration curve of the measurement environment, the mass calibration curve of the measurement environment being used to characterize a relationship between measured mass parameters of the at least two demarcation pieces measured in the measurement environment and predetermined nominal mass parameters of the at least two demarcation pieces;
      demarcating the at least two demarcation pieces in a standard environment to obtain a mass calibration curve of the standard environment, the mass calibration curve of the standard environment being used to characterize a relationship between measured mass parameters of the at least two demarcation pieces measured in the standard environment and the predetermined nominal mass parameters of the at least two demarcation pieces;
      fitting the mass calibration curve of the measurement environment with respect to the mass calibration curve of the standard environments to obtain the displacement function.

7. The method according to claim 6, wherein the measurement environment is different from the standard environment in terms of contaminants as well as target influencing factors, the target influencing factors comprising environmental factors that cause a change in radiation transmittance other than the contaminants.

8. The method according to claim 7, further comprising:
   obtaining a first initial displacement and a second initial displacement by simulation, the first initial displacement being used to characterize a deviation of the radiation transmittance only under influence of a contaminant in the measurement environment in comparison with the radiation transmittance in the standard environment; and the second initial displacement being used to characterize a deviation of the radiation transmittance in the measurement environment in comparison with the radiation transmittance in the standard environment; and
   updating the displacement function based on a ratio of the second initial displacement to the first initial displacement, wherein the updated displacement function is a product of the displacement function before the update and the ratio.

9. The method according to claim 8, wherein each initial displacement is calculated using following formula:

$$C = I_f/I_a - I_f^0/I_a^0$$

wherein:
   C represents the initial displacement;
   $I_f$ represents a radiation intensity measured after the rays have passed through the demarcation piece in an environment corresponding to the initial displacement;
   $I_a$ represents a radiation intensity measured after the rays have passed through the air in the environment corresponding to the initial displacement;
   $I_f^0$ represents a radiation intensity measured after the rays have passed through the demarcation piece in the standard environment; and
   $I_a^0$ represents a radiation intensity measured after the rays have passed through the air in the standard environment.

10. The method according to claim 8, wherein each mass calibration curve is obtained using following formula:

$$Q = Q_1 - \frac{1}{\mu}\log_e \frac{I_s}{I_a} \bigg/ \frac{I_s^0}{I_a^0}$$

wherein:
Q represents a measured mass parameter of the demarcation piece calculated based on a radiation intensity and radiation attenuation coefficient of the rays that have passed through the demarcation piece;
$Q_1$ represents an actual mass parameter of the demarcation piece;
μ represents the radiation attenuation coefficient;
$I_s$ represents a radiation intensity measured after the rays have passed through the demarcation piece in an environment corresponding to the mass calibration curve;
$I_a$ represents a radiation intensity measured after the rays have passed through the air in the environment corresponding to the mass calibration curve;
$I_a^0$ represents a radiation intensity of the rays emitted by a radiation source; and
$I_s^0$ represents a radiation intensity of the demarcation piece.

11. The method according to claim 6, wherein demarcating the at least two demarcation pieces in the measurement environment to obtain the mass calibration curve of the measurement environment comprises:
when a predetermined period is reached, demarcating the at least two demarcation pieces in the measurement environment to obtain the mass calibration curve of the measurement environment.

12. A measurement apparatus, comprising:
a measured mass parameter determining module configured to determine a measured mass parameter of a workpiece being measured based on radiation intensity of rays that have passed through the workpiece being measured; and
a mass parameter correction module configured to correct the measured mass parameter using a displacement function of the workpiece being measured in a measurement environment, to obtain the corrected mass parameter of the workpiece being measured, wherein the displacement function is used to characterize influence of environmental factors on radiation in the measurement environment and is obtained by:
obtaining measured mass parameters of at least two demarcation pieces measured based on radiation intensity of rays that have passed through the at least two demarcation pieces; and
solving for parameter values of an initial function according to the measured mass parameters of the at least two demarcation pieces and actual mass parameters of the at least two demarcation pieces to obtain the displacement function.

13. A radiation measuring device, comprising:
a radiation source;
a radiation detector, wherein a gap is provided between the radiation detector and the radiation source, and the gap is configured to allow a workpiece being measured to pass;
at least two demarcation pieces having different thicknesses, wherein each of the demarcation pieces is capable of moving into the gap;
a drive assembly, wherein the drive assembly is connected to the at least two demarcation pieces, and the drive assembly is configured to drive at least one of the demarcation pieces to move into the gap; and
a control means electrically connected to the drive assembly, the radiation source, and the radiation detector, wherein the control means comprises the measurement apparatus according to claim 12.

14. The device according to claim 13, wherein:
the at least two demarcation pieces comprise a first demarcation piece and a second demarcation piece, wherein the first demarcation piece and the second demarcation piece are spaced apart along a direction from the radiation source to the radiation detector;
wherein the drive assembly is configured to drive the first demarcation piece and the second demarcation piece separately to move into the gap, and drive the first demarcation piece and the second demarcation piece to move simultaneously into the gap to form a third demarcation piece.

15. The apparatus according to claim 12, further comprising:
a mass calibration curve generation module configured to demarcate the at least two demarcation pieces in a measurement environment to obtain a mass calibration curve of the measurement environment, the mass calibration curve being used to characterize a relationship between measured mass parameters and predetermined nominal mass parameters, of the demarcation pieces; and
a displacement curve function generation module configured to fit the mass calibration curve of the measurement environment with respect to a mass calibration curve of a standard environment to obtain the displacement curve function, the displacement function being used to characterize an amount of change in radiation transmittance in the measurement environment relative to the standard environment.

16. The apparatus according to claim 15, wherein the measurement environment is different from the standard environment in terms of contaminants as well as target influencing factors, the target influencing factors comprising environmental factors that cause a change in radiation transmittance other than the contaminants.

17. The apparatus according to claim 16, further comprising:
a simulation module configured to obtain a first initial displacement and a second initial displacement by simulation, the first initial displacement being used to characterize a deviation of the radiation transmittance only under influence of a contaminant in the measurement environment in comparison with the radiation transmittance in the standard environment; and the second initial displacement being used to characterize a deviation of the radiation transmittance in the measurement environment in comparison with the radiation transmittance in the standard environment; and
a displacement curve function update module configured to update the displacement curve function based on a ratio of the second initial displacement to the first initial displacement, wherein the updated displacement curve function is a product of the displacement curve function before the update and the ratio.

18. The apparatus according to claim 17, wherein each initial displacement is calculated using following formula:

$$C = I_f/I_a - I_f^0/I_a^0$$

wherein
- C represents the initial displacement;
- $I_f$ represents a radiation intensity measured after the rays have passed through the demarcation piece in an environment corresponding to the initial displacement;
- $I_a$ represents a radiation intensity measured after the rays have passed through the air in the environment corresponding to the initial displacement;
- $I_f^0$ represents a radiation intensity measured after the rays have passed through the demarcation piece in the standard environment; and
- $I_a^0$ represents a radiation intensity measured after the rays have passed through the air in the standard environment.

19. The apparatus according to claim 17, wherein each mass calibration curve is obtained using following formula:

$$Q = Q_1 - \frac{1}{\mu} \log_e \frac{I_s}{I_a} \bigg/ \frac{I_s^0}{I_a^0}$$

wherein:
- Q represents a measured mass parameter of the demarcation piece calculated based on a radiation intensity and radiation attenuation coefficient of the rays that have passed through the demarcation piece;
- $Q_1$ represents an actual mass parameter of the demarcation piece;
- $\mu$ represents the radiation attenuation coefficient;
- $I_s$ represents a radiation intensity measured after the rays have passed through the demarcation piece in an environment corresponding to the mass calibration curve;
- $I_a$ represents a radiation intensity measured after the rays have passed through the air in the environment corresponding to the mass calibration curve;
- $I_a^0$ represents a radiation intensity of the rays emitted by a radiation source; and
- $I_s^0$ represents a radiation intensity of the demarcation piece.

20. The apparatus according to claim 16, wherein the mass calibration curve generation module is specifically configured to:
when a predetermined period is reached, demarcate the at least two demarcation pieces in the measurement environment to obtain the mass calibration curve of the measurement environment.

* * * * *